US012747026B2

(12) United States Patent
Yazici et al.

(10) Patent No.: US 12,747,026 B2

(45) Date of Patent: Sep. 29, 2026

(54) AIR SYSTEM FOR AIRCRAFT PROPULSION SYSTEM ELECTRIC MACHINE

(71) Applicant: RTX Corporation, Farmington, CT (US)

(72) Inventors: Murat Yazici, Glastonbury, CT (US); Thomas E. Clark, Wells, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/048,481

(22) Filed: Feb. 7, 2025

(65) Prior Publication Data

US 2026/0233849 A1 Aug. 13, 2026

(51) Int. Cl.

*B64D 33/08* (2006.01)
*B64D 27/33* (2024.01)
*F01D 15/10* (2006.01)

(52) U.S. Cl.

CPC ............. *B64D 33/08* (2013.01); *B64D 27/33* (2024.01); *F01D 15/10* (2013.01); *F05D 2220/323* (2013.01); *F05D 2220/76* (2013.01); *F05D 2260/234* (2013.01)

(58) Field of Classification Search

CPC ......... B64D 27/33; B64D 33/08; F01D 15/10; F05D 2220/323; F05D 2220/76; F05D 2260/234

See application file for complete search history.

(56) References Cited

U.S. PATENT DOCUMENTS 11,641,144 B2 5/2023 Paziński
11,891,954 B2 2/2024 Paziński
2013/0133336 A1* 5/2013 Barnett .................. F01D 25/04 248/671
2019/0316486 A1 10/2019 Roberge
2020/0291810 A1* 9/2020 Spierling .................. F02C 7/12
2021/0239046 A1 8/2021 Muldoon
2021/0324799 A1* 10/2021 Suzuki .................. B64D 33/08
2024/0426239 A1* 12/2024 Zatorski .................. F02K 5/00

FOREIGN PATENT DOCUMENTS

FR 3132731 B1 1/2024
FR 3132729 B1 5/2025

OTHER PUBLICATIONS

EP Search Report for EP Patent Application No. 26157038.6 dated Jun. 17, 2026.

* cited by examiner

*Primary Examiner* — Hoang M Nguyen

(74) *Attorney, Agent, or Firm* — Getz Balich LLC

(57) ABSTRACT

An assembly is provided for an aircraft propulsion system. This assembly includes a compressor section, a combustor section, a turbine section, a flowpath, a tail cone structure, an electric machine and an electric fan. The flowpath includes a flowpath inlet and a flowpath exhaust. The flowpath extends through the compressor section, the combustor section and the turbine section from the flowpath inlet to the flowpath exhaust. The tail cone structure forms an inner peripheral boundary of the flowpath at the flowpath exhaust. The tail cone structure includes an internal volume and an outlet fluidly coupled with the internal volume. The electric machine is disposed within the internal volume. The electric fan is configured to flow air within the internal volume such that the air cools the electric machine and is exhausted from the tail cone structure through the outlet.

20 Claims, 8 Drawing Sheets

AIR SYSTEM FOR AIRCRAFT PROPULSION SYSTEM ELECTRIC MACHINE

BACKGROUND OF THE DISCLOSURE

1. Technical Field

This disclosure relates generally to an aircraft and, more particularly, to an air system for the aircraft.

2. Background Information

An aircraft and its propulsion system(s) may include various onboard air systems. Various types and configurations of air systems are known in the art, including air cooling systems. While these air systems have various benefits, there is still room in the art for improvement.

SUMMARY OF THE DISCLOSURE

According to an aspect of the present disclosure, an assembly is provided for an aircraft propulsion system. This assembly includes a compressor section, a combustor section, a turbine section, a flowpath, a tail cone structure, an electric machine and an electric fan. The flowpath includes a flowpath inlet and a flowpath exhaust. The flowpath extends through the compressor section, the combustor section and the turbine section from the flowpath inlet to the flowpath exhaust. The tail cone structure forms an inner peripheral boundary of the flowpath at the flowpath exhaust. The tail cone structure includes an internal volume and an outlet fluidly coupled with the internal volume. The electric machine is disposed within the internal volume. The electric fan is configured to flow air within the internal volume such that the air cools the electric machine and is exhausted from the tail cone structure through the outlet.

According to another aspect of the present disclosure, another assembly is provided for an aircraft propulsion system. This assembly includes a compressor section, a combustor section, a turbine section, a flowpath, a tail cone structure, an electric machine and an electric fan. The flowpath includes a flowpath inlet and a flowpath exhaust. The flowpath extends through the compressor section, the combustor section and the turbine section from the flowpath inlet to the flowpath exhaust. The tail cone structure forms an inner peripheral boundary of the flowpath at the flowpath exhaust. The tail cone structure includes an internal volume. The electric machine is disposed within the internal volume. The air system is configured to direct air into the tail cone structure to cool the electric machine. The air system includes an electric air mover.

According to still another aspect of the present disclosure, another assembly is provided for an aircraft propulsion system. This assembly includes a compressor section, a combustor section, a turbine section, a flowpath, a tail cone structure, an electric machine and an electric fan. The flowpath includes a flowpath inlet and a flowpath exhaust. The flowpath extends through the compressor section, the combustor section and the turbine section from the flowpath inlet to the flowpath exhaust. The tail cone structure forms an inner peripheral boundary of the flowpath at the flowpath exhaust. The tail cone structure includes an internal volume. The electric machine is disposed within the internal volume. The air system is configured to direct air into the tail cone structure to cool the electric machine. The air system includes a fan rotor disposed within the internal volume.

The tail cone structure may also include an outlet fluidly coupled with the internal volume. The outlet may be configured to exhaust the air from the tail cone structure.

The electric fan may be disposed within the tail cone structure.

The electric machine may be disposed between the electric fan and the outlet.

The electric fan may be disposed between the electric machine and the outlet.

A rotational axis of the electric fan may be coaxial with a rotational axis of the electric machine.

A rotational axis of the electric fan may be offset from a rotational axis of the electric machine.

The electric fan may be one of a plurality of electric fans configured to flow the air within the internal volume.

The electric fans may include a first electric fan and a second electric fan. The electric machine may be disposed axially between the first electric fan and the second electric fan.

The electric fans may include a first electric fan and a second electric fan. The first electric fan may be axially aligned with the second electric fan.

The electric fans may be arranged circumferentially about an axis in an array.

The assembly may also include an air source and an air circuit. The air circuit may include a circuit inlet and a circuit outlet. The circuit inlet may be configured to receive the air from the air source. The circuit outlet may be configured to direct the air into the internal volume.

The assembly may also include a vane structure including an inner platform, an outer platform and a plurality of vanes. The inner platform may form an inner peripheral boundary of the flowpath through the vane structure. The outer platform may form an outer peripheral boundary of the flowpath through the vane structure. The vanes may be arranged circumferentially about an axis in an array. Each of the vanes may extend radially across the flowpath from the inner platform to the outer platform. The vanes may include a first vane. The air circuit may be configured to direct the air radially inward across the flowpath through the first vane.

The electric machine may be configurable as an electric motor during a motor mode of operation.

The electric machine may be configurable as an electric generator during a generator mode of operation.

The assembly may also include a rotating structure. The rotating structure may include a bladed rotor disposed in the compressor section or the turbine section. The electric machine may include an electric machine rotor operatively coupled to the rotating structure.

The assembly may also include a ducted propulsor rotor and a rotating structure.

The rotating structure may be operatively coupled to and configured to drive rotation of the ducted propulsor rotor. The rotating structure may include a turbine rotor disposed in the turbine section.

The assembly may also include an open propulsor rotor and a rotating structure.

The rotating structure may be operatively coupled to and configured to drive rotation of the open propulsor rotor. The rotating structure may include a turbine rotor disposed in the turbine section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
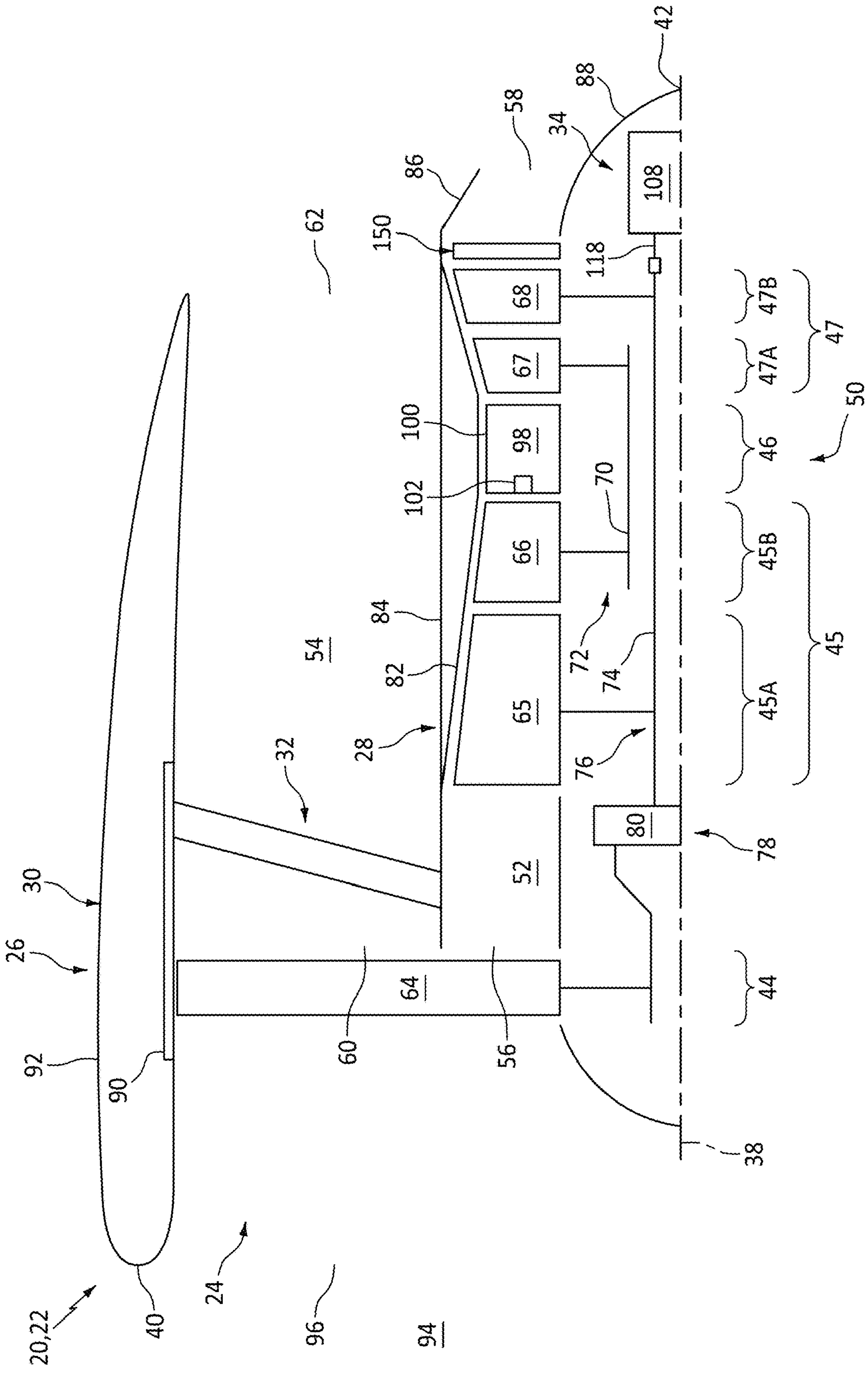
FIG. 1 is a partial schematic illustration of an aircraft propulsion system with a ducted propulsor rotor.

FIG. 1 illustrates a powerplant 20 for an aircraft. The aircraft may be an airplane, a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 also includes an electric machine system 34 (see FIG. 2) and an air system 36 (see FIG. 3). The aircraft propulsion system 22 extends axially along an axis 38 between an axial upstream, forward end 40 of the aircraft propulsion system 22 and an axial downstream, aft end 42 of the aircraft propulsion system 22. Briefly, the propulsion system axis 38 may be a centerline axis of the aircraft propulsion system 22, the turbine engine 24 and/or one or more of its members. The propulsion system axis 38 may also or alternatively be a rotational axis for one or more members of the turbine engine 24.

The aircraft propulsion system 22 and its turbine engine 24 of FIG. 1 include a propulsor section 44 (e.g., a fan section), a compressor section 45, a combustor section 46 and a turbine section 47. The compressor section 45 of FIG. 1 includes a low pressure compressor (LPC) section 45A and a high pressure compressor (HPC) section 45B. The turbine section 47 of FIG. 1 includes a high pressure turbine (HPT) section 47A and a low pressure turbine (LPT) section 47B. At least (or only) the LPC section 45A, the HPC section 45B, the combustor section 46, the HPT section 47A and the LPT section 47B collectively form a core 50 (e.g., a gas generator) of the turbine engine 24. The aircraft propulsion system 22 and its turbine engine 24 of FIG. 1 also include a core flowpath 52 (e.g., an annular core flowpath) and a bypass flowpath 54 (e.g., an annular bypass flowpath). The core flowpath 52 extends sequentially through the LPC section 45A, the HPC section 45B, the combustor section 46, the HPT section 47A and the LPT section 47B from an airflow inlet 56 into the core flowpath 52 to a combustion products exhaust 58 out from the core flowpath 52. The bypass flowpath 54 extends through a bypass duct from an airflow inlet 60 into the bypass flowpath 54 to an airflow exhaust 62 from the bypass flowpath 54, where the bypass duct may be formed by the inner housing structure 28 and the outer housing structure 30. The bypass flowpath 54 and its bypass duct are configured to bypass (e.g., are disposed radially outboard of and extend along) the engine core 50 and the inner housing structure 28.

The propulsor section 44, the LPC section 45A, the HPC section 45B, the combustor section 46, the HPT section 47A and the LPT section 47B may be arranged sequentially along the propulsion system axis 38 within the propulsion system housing 26. The propulsor section 44 includes a bladed propulsor rotor 64; e.g., a fan rotor. The LPC section 45A includes a bladed low pressure compressor (LPC) rotor 65. The HPC section 45B includes a bladed high pressure compressor (HPC) rotor 66. The HPT section 47A includes a bladed high pressure turbine (HPT) rotor 67. The LPT section 47B includes a bladed low pressure turbine (LPT) rotor 68. Each of these engine rotors 64-68 includes a rotor base (e.g., a disk or a hub) and a plurality of rotor blades (e.g., airfoils, vanes, etc.). The rotor blades may be arranged into one or more stages axially along the respective engine rotor 64-68. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 66 is coupled to and rotatable with the HPT rotor 67. The HPC rotor 66 of FIG. 1, for example, is connected to the HPT rotor 67 through a high speed shaft 70. At least (or only) the HPC rotor 66, the HPT rotor 67 and the high speed shaft 70 collectively form a high speed rotating structure 72; e.g., a high speed spool of the turbine engine 24 and its engine core 50. This high speed rotating structure 72 of FIG. 1 and its members 66, 67 and 70 are rotatable about the propulsion system axis 38. However, it is contemplated the high speed rotating structure 72 may alternatively be rotatable about another axis radially and/or angularly offset from the rotational axis of the propulsor rotor 64 and/or the centerline axis of the turbine engine 24.

The LPC rotor 65 is coupled to and rotatable with the LPT rotor 68. The LPC rotor 65 of FIG. 1, for example, is connected to the LPT rotor 68 through a low speed shaft 74. At least (or only) the LPC rotor 65, the LPT rotor 68 and the low speed shaft 74 collectively form a low speed rotating structure 76; e.g., a low speed spool of the turbine engine 24 and its engine core 50. This low speed rotating structure 76 of FIG. 1 and its members 65, 68 and 74 are rotatable about the propulsion system axis 38. However, it is contemplated the low speed rotating structure 76 may alternatively be rotatable about another axis radially and/or angularly offset from the rotational axis of the propulsor rotor 64 and/or the centerline axis of the turbine engine 24.

The low speed rotating structure 76 is coupled to the propulsor rotor 64 through a drivetrain 78. The drivetrain 78 may be configured as a geared drivetrain, where a geartrain 80 (e.g., a transmission, a speed change device, an epicyclic geartrain, etc.) is disposed between and operatively couples the propulsor rotor 64 to the low speed rotating structure 76 and its LPT rotor 68. With this arrangement, the propulsor rotor 64 may rotate at a different (e.g., slower) rotational speed than the low speed rotating structure 76 and its LPT rotor 68. Here, the propulsor rotor 64 and the low speed rotating structure 76 may rotate in a common (the same) direction about the propulsion system axis 38 or in opposite directions about the propulsion system axis 38 depending, for example, upon the specific configuration of the geartrain 80. Alternatively, the drivetrain 78 may be configured as a direct-drive drivetrain, where the geartrain 80 is omitted. With such an arrangement, the propulsor rotor 64 rotates at a common (the same) rotational speed as the low speed rotating structure 76 and its LPT rotor 68.

The inner housing structure 28 of FIG. 1 includes an inner case 82 (e.g., a core case) for the turbine engine 24 and an inner nacelle structure 84 (sometimes referred to as an inner fixed structure (IFS)). The inner case 82 is disposed radially outboard of, extends axially along and may circumscribe one or more or all of the engine sections 45A-47B and the engine rotors 65-68. The inner case 82 may thereby house and provide a support structure for the respective engine sections 45A-47B and the engine rotors 65-68. The inner nacelle structure 84 is configured to provide an aerodynamic cover over the engine core 50 and its inner case 82. At least (or only) the inner housing structure 28 and its inner nacelle structure 84 may collectively form a radial inner peripheral boundary of the bypass flowpath 54. A downstream/aft portion of the inner housing structure 28 such as, for example, a (e.g., tubular) core exhaust nozzle 86 of the inner nacelle structure 84 also covers at least a portion of a tail cone structure 88; e.g., an (e.g., conical) exhaust center body. More particularly, the inner nacelle structure 84 and its exhaust nozzle 86 axially overlap and extend circumferentially about (e.g., completely around) the tail cone structure 88. The exhaust nozzle 86 and the tail cone structure 88 of FIG. 1 (see also FIG. 3) collectively form a downstream/aft portion of the core flowpath 52 and its core exhaust 58.

The outer housing structure 30 of FIG. 1 includes an outer case 90 (e.g., a fan case) for the turbine engine 24 and an outer nacelle structure 92. The outer case 90 is disposed radially outboard of, extends axially along and may circumscribe the propulsor section 44 and its propulsor rotor 64. The outer case 90 may thereby house and may be configured as a containment structure for the propulsor section 44 and its propulsor rotor 64. The outer nacelle structure 92 is configured to provide an aerodynamic cover over the outer case 90. At least (or only) the outer housing structure 30 and its outer nacelle structure 92 may collectively form a radial outer peripheral boundary of the bypass flowpath 54.

During operation of the aircraft propulsion system 22 of FIG. 1, ambient air from an environment 94 external to the aircraft and its aircraft propulsion system 22 enters the aircraft propulsion system 22 and its turbine engine 24 through an airflow inlet 96. This air is propelled by the rotating propulsor rotor 64 in a downstream, aft direction towards the propulsion system aft end 42.

An outer stream of the air propelled by the rotating propulsor rotor 64 is directed into the bypass flowpath 54 through its bypass inlet 60, which air entering the bypass flowpath 54 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 62 to provide forward thrust. The propulsion of the bypass air may account for a majority of the forward thrust generated by the aircraft propulsion system 22 and its turbine engine 24 of FIG. 1.

An inner stream of the air propelled by the rotating propulsor rotor 64 is directed into the core flowpath 52 through its core inlet 56, which air entering the core flowpath 52 may be referred to as "core air". This core air is compressed by the LPC rotor 65 and the HPC rotor 66 and is directed into a combustion chamber 98 (e.g., annular combustion chamber) of a combustor 100 (e.g., annular combustor) in the combustor section 46. Fuel is injected into the combustion chamber 98 by one or more fuel injectors 102 and mixed with the compressed core air to provide a fuel-air mixture. This fuel-air mixture is ignited and combustion products thereof flow through and sequentially drive rotation of the HPT rotor 67 and the LPT rotor 68. The rotation of the HPT rotor 67 and the LPT rotor 68 respectively drive rotation of the HPC rotor 66 and the LPC rotor 65 and, thus, compression of the air received from the core inlet 56. The rotation of the LPT rotor 68 also drives rotation of the propulsor rotor 64 through the drivetrain 78.

Figure 2:
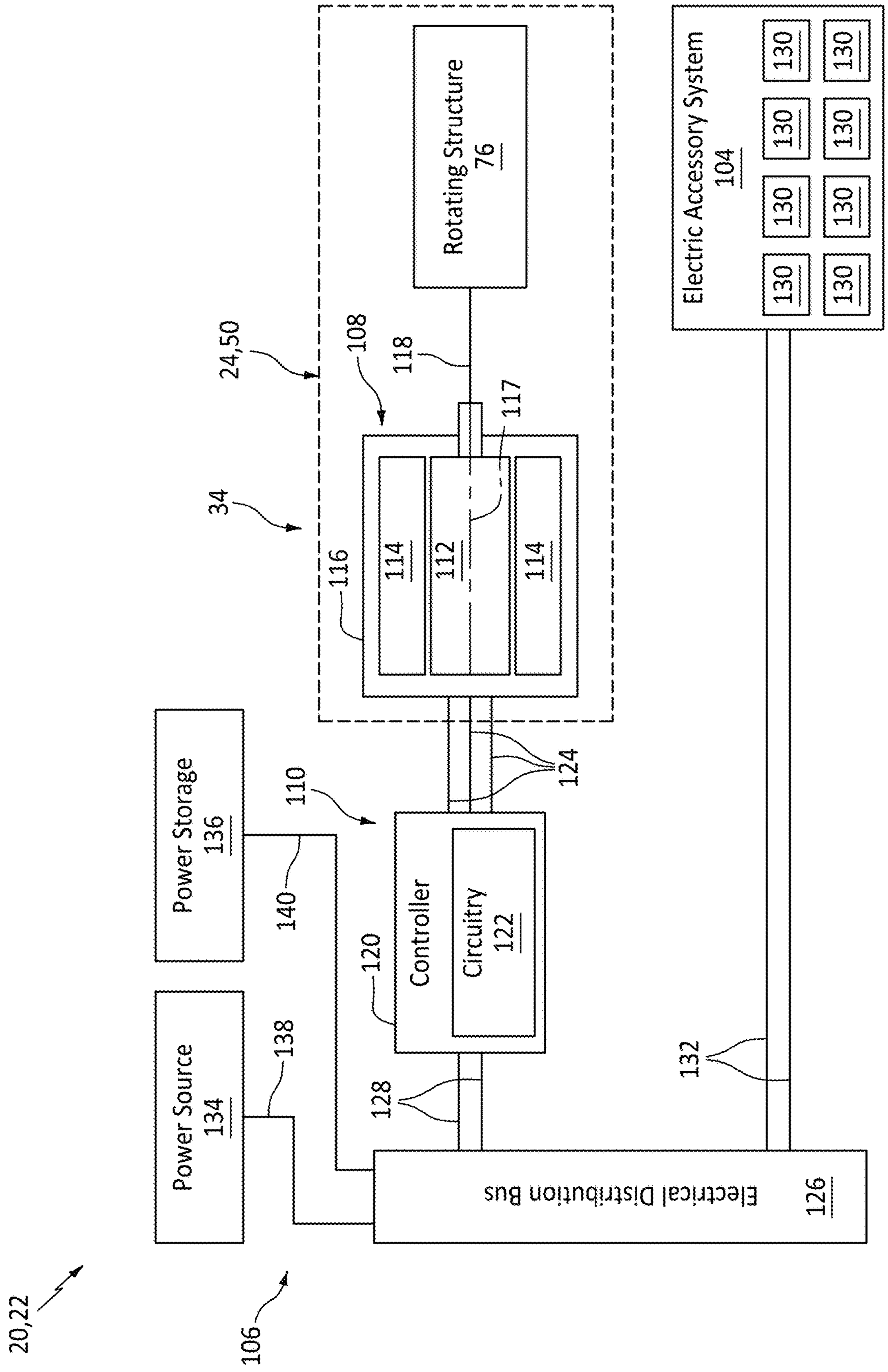
FIG. 2 is a schematic illustration of a portion of the aircraft propulsion system with an electric machine system.

Referring to FIG. 2, the electric machine system 34 is electrically coupled to an optional electric accessory system 104 and an electrical system 106 for the aircraft and its aircraft propulsion system 22. The electric machine system 34 of FIG. 2 includes at least (or only) one electric machine 108 and an electric machine (EM) controller 110 for the electric machine 108. For ease of description, the electric machine 108 of FIG. 2 is described below as being electrically coupled to, controlled by and/or otherwise associated with a single, dedicated EM controller 110. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with the single electric machine.

The electric machine 108 of FIG. 2 includes an electric machine rotor 112, an electric machine stator 114 and an electric machine housing 116; e.g., a case. The machine rotor 112 is rotatable about a rotational axis 117 of the machine rotor 112, which electric machine (EM) axis 117 may also be a centerline axis of the electric machine 108. The machine stator 114 of FIG. 2 is radially outboard of and circumscribes the machine rotor 112. With this arrangement, each electric machine 108 is configured as a radial flux electric machine. The electric machine 108 of the present disclosure, however, is not limited to such an exemplary rotor-stator configuration nor to radial flux arrangements. The machine rotor 112, for example, may alternatively be radially outboard of and circumscribe the machine stator 114. In another example, the machine rotor 112 may be axially next to the machine stator 114 configuring the electric machine 108 as an axial flux electric machine. Referring again to FIG. 2, the machine rotor 112 and the machine stator 114 are at least partially or completely housed within an interior of the machine housing 116.

The electric machine 108 may be operatively coupled to a respective one of the engine rotating structures 72, 76 (see FIG. 1). The machine rotor 112 of FIG. 2, for example, is mechanically coupled to and rotatable with the low speed rotating structure 76 at least or only through a drivetrain 118. This drivetrain 118 may be configured as or otherwise include a shaft, a gearbox, and/or the like.

The electric machine 108 of FIG. 2 may be configurable as an electric motor and/or an electric generator; e.g., an electric motor-generator. For example, during a motor mode of operation, the electric machine 108 may operate as the electric motor to convert electricity received from the aircraft electrical system 106 into mechanical power. The machine stator 114, for example, may generate an electromagnetic field with the machine rotor 112 using a current of electricity received from the aircraft electrical system 106 through the EM controller 110. This electromagnetic field may drive rotation of the machine rotor 112. The machine rotor 112, in turn, may provide mechanical power to and drive rotation of the low speed rotating structure 76 through the respective drivetrain 118. This mechanical power may be provided to boost power or completely power the rotation of the low speed rotating structure 76. By contrast, during a generator mode of operation, the electric machine 108 may operate as the electric generator to convert mechanical power received from the low speed rotating structure 76 into electricity. Rotation of the machine rotor 112, for example, may be rotationally driven by rotation of the low speed rotating structure 76 through the drivetrain 118. The rotation of the machine rotor 112 may generate an electromagnetic field with the machine stator 114, and the machine stator 114 may convert energy from the electromagnetic field into electricity. The electric machine 108 may then provide a current of electricity to the aircraft electrical system 106 through the EM controller 110 for storage and/or further use. The electric machine 108 of the present disclosure, however, is not limited to such exemplary operation. For example, the electric machine 108 may alternatively be configured as a dedicated electric generator; e.g., without the electric motor functionality. In another example, the electric machine 108 may alternatively be configured as a dedicated electric motor; e.g., without the electric generator functionality.

The EM controller 110 includes a controller housing 120 and internal controller circuitry 122. The controller housing 120 may be configured as an enclosed case (e.g., a closed or sealed container) for the respective controller circuitry 122. The controller circuitry 122 is disposed within an interior of the controller housing 120; e.g., an internal chamber or other volume(s) within and enclosed by the controller housing 120. The controller circuitry 122 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), processing device(s), memory module(s), communication module(s), electrical transformer (s), electrical rectifier(s), and/or the like.

The EM controller 110 is electrically coupled to the electric machine 108 through one or more electric cables 124; e.g., high voltage electric cables, power feeder cables, etc. More particularly, the controller circuitry 122 of the EM controller 110 is electrically coupled to the electric machine 108 and its machine stator 114 through the electric cables 124. Similarly, the EM controller 110 is electrically coupled to an electrical distribution bus 126 of the aircraft electrical system 106 through one or more electric cables 128; e.g., high voltage electric cables, power feeder cables, etc. More particularly, the controller circuitry 122 of the EM controller 110 is electrically coupled to the aircraft electrical system 106 and its electrical distribution bus 126 through the respective electric cables 128.

The EM controller 110 and its controller circuitry 122 are configured to control operation of the electric machine 108. For example, when operating as the electric motor, the EM controller 110 and its controller circuitry 122 are configured to regulate a flow of electricity from the aircraft electrical system 106 to the electric machine 108. This electricity flow regulation may include: (a) turning-on the flow of electricity from the aircraft electrical system 106 to the electric machine 108 (e.g., electrically coupling the electric machine 108 to the aircraft electrical system 106); (b) turning-off the flow of electricity from the aircraft electrical system 106 to the electric machine 108 (e.g., electrically decoupling the electric machine 108 from the aircraft electrical system 106); (c) moderating the flow of electricity from the aircraft electrical system 106 to the electric machine 108. Here, the EM controller 110 operates as a motor controller. In another example, when operating as the electric generator, the EM controller 110 and its controller circuitry 122 are configured to regulate a flow of electricity from the electric machine 108 to the aircraft electrical system 106. This electricity flow regulation may include: (a) turning-on the flow of electricity from the electric machine 108 to the aircraft electrical system 106 (e.g., electrically coupling the electric machine 108 to the aircraft electrical system 106); (b) turning-off the flow of electricity from the electric machine 108 to the aircraft electrical system 106 (e.g., electrically decoupling the electric machine 108 from the aircraft electrical system 106); (c) moderating the flow of electricity from the electric machine 108 to the aircraft electrical system 106. Here, the EM controller 110 operates as a generator controller.

The electric accessory system 104 includes one or more electric devices 130. The electric devices 130 may include one or more electric actuators, one or more electric pumps, one or more electric valves and/or one or more fluid separator(s) (e.g., de-oiler(s)). The electric actuator(s) may include one or more electric linear actuators and/or one or more electric rotary actuators. The electric pump(s) may include one or more electric liquid pumps and/or one or more electric gas pumps (e.g., electric air compressor(s)). The electric devices 130 of FIG. 2 may be configured as part of one or more sub-systems for the aircraft propulsion system 22 and its turbine engine 24. Examples of these sub-systems include, but are not limited to: a fuel system for delivering the fuel to the fuel injectors 102 (see FIG. 1); a lubrication system for delivering lubricant (e.g., oil) to one or more lubricated components (e.g., bearing(s), gear system (s), seal system(s), etc.) of the aircraft propulsion system 22 and its turbine engine 24; a cooling system for delivering coolant (e.g., liquid coolant, air, etc.) to one or more fluid cooled components of the aircraft propulsion system 22 and its turbine engine 24; and an actuation system for moving one or more adjustable components (e.g., variable guide vanes, a variable area nozzle, etc.) of the aircraft propulsion system 22 and its turbine engine 24. One, some or all of these sub-systems may be discrete (e.g., operationally, mechanically, fluidly, etc. independent) from one another. Alternatively, some of the sub-systems may be integrated to share, for example, a common working fluid such as the lubricant or the fuel. The present disclosure, however, is not limited to the foregoing exemplary electric devices or sub-systems which may include those electric devices.

Each electric device 130 is electrically coupled to the electrical distribution bus 126 of the aircraft electrical system 106 through one or more electric cables 132 (collectively schematically shown); e.g., high voltage electric cables, low voltage electric cables, power feeder cables, etc.

Each electric device 130 may thereby receive a current of electricity from the aircraft electrical system 106 to power operation thereof.

The aircraft electrical system 106 includes the electrical distribution bus 126. This aircraft electrical system 106 may also include a power source 134 and/or a power storage 136. The electrical distribution bus 126 is electrically coupled to the electric machine 108 through its EM controller 110. The electrical distribution bus 126 is electrically coupled to each of the electric devices 130. The electrical distribution bus 126 is also electrically coupled to the power source 134 and the power storage 136, respectively schematically shown via lines 138 and 140. With this arrangement, the electrical distribution bus 126 provides an intermediate connection between the various electrical aircraft propulsion system members 108 (via 110), 130, 134 and/or 136. The power source 134 may be an electric generator powered by the turbine engine 24 or an electric generator powered by another aircraft powerplant; e.g., an engine of a companion aircraft propulsion system, an engine of an auxiliary power unit (APU), a fuel cell system, etc. The power storage 136 is configured to receive electricity from the electrical distribution bus 126 for storage. The power storage 136 is also configured to provide the stored electricity to the electrical distribution bus 126. The power storage 136, for example, may be configured as or otherwise include one or more electricity storage devices; e.g., batteries, super capacitors, etc. With the foregoing aircraft electrical system 106 arrangement, the electrical current provided to one, some or all of the electric devices 130 may be received, through the electrical distribution bus 126, from any one, some or all of the electrical aircraft propulsion system members 108, 134 and/or 136.

Figure 3:
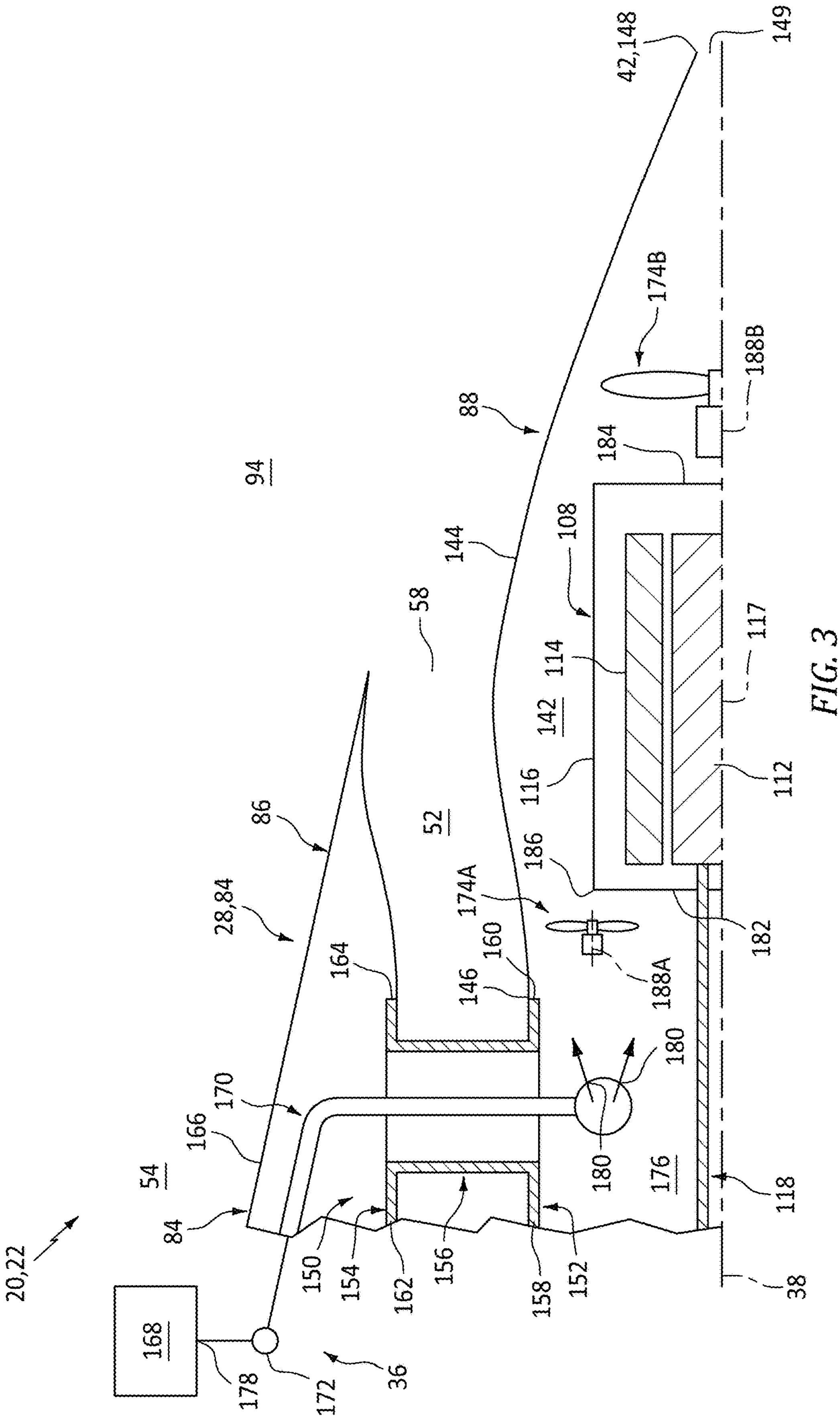
FIG. 3 is a schematic illustration of a portion of the aircraft propulsion system with an air system.

Referring to FIG. 3, the electric machine 108 is disposed at least partially or completely within an internal volume 142 (e.g., a cavity, a chamber, etc.) of the tail cone structure 88. A radial outer periphery of this tail cone volume 142 may be at least partially or completely formed by a sidewall 144 of the tail cone structure 88. The tail cone sidewall 144 of FIG. 3, for example, is spaced radially outboard from the electric machine 108. The tail cone sidewall 144 extends axially along the propulsion system axis 38 from an upstream, forward end 146 of the tail cone structure 88 to a downstream, aft end 148 of the tail cone structure 88; e.g., a trailing end/tip of the tail cone structure 88. The tail cone sidewall 144 extends circumferentially around the propulsion system axis 38, providing the tail cone structure 88 and its tail cone sidewall 144 with a full-hoop (e.g., generally conical) body. The tail cone structure 88 and its tail cone sidewall 144 of FIG. 3 thereby axially overlap and circumscribe the electric machine 108 disposed within its tail cone volume 142.

The tail cone volume 142 may be fluidly coupled to the external environment 94 though an airflow outlet 149 from the tail cone structure 88; e.g., a center vent hole. The tail cone outlet 149, for example, may be formed by an aperture through the tail cone sidewall 144 at the tail cone aft end 148. The tail cone outlet 149 may thereby extend axially along the propulsion system axis 38, through the tail cone sidewall 144, from the tail cone volume 142 to the external environment 94.

The tail cone structure 88 of FIG. 3 is disposed axially next to (along the propulsion system axis 38) and downstream of (along the core flowpath 52) a stator vane structure 150 of the turbine engine 24. The tail cone structure 88 may also be mounted to the stator vane structure 150. This stator vane structure 150 may be configured as or otherwise include a turbine exhaust case (TEC) for the turbine engine 24 and its turbine section 47 (see FIG. 1). The stator vane structure 150 of FIG. 3, for example, includes a radial inner platform 152, a radial outer platform 154 and a plurality of stator vanes 156; e.g., aerodynamic struts, nozzle vanes, exit guide vanes, etc.

The vane structure inner platform 152 extends axially along the propulsion system axis 38 from an upstream, forward end 158 of the vane structure inner platform 152 to a downstream, aft end 160 of the vane structure inner platform 152. The vane structure inner platform 152 extends circumferentially around the propulsion system axis 38, providing the vane structure inner platform 152 with a full-hoop (e.g., tubular) body. The vane structure inner platform 152 thereby forms a radial inner peripheral boundary of a section of the core flowpath 52 which extends longitudinally through the stator vane structure 150. This inner peripheral boundary of the core flowpath 52 may be adjacent to and substantially or completely flush with a radial inner peripheral boundary of a downstream section of the core flowpath 52 which extends longitudinally along the tail cone structure 88 to the core exhaust 58.

The vane structure outer platform 154 is spaced radially outboard from the vane structure inner platform 152. The vane structure outer platform 154 extends axially along the propulsion system axis 38 from an upstream, forward end 162 of the vane structure outer platform 154 to a downstream, aft end 164 of the vane structure outer platform 154. The vane structure outer platform 154 extends circumferentially around the propulsion system axis 38, providing the vane structure outer platform 154 with a full-hoop (e.g., tubular) body. The vane structure outer platform 154 thereby forms a radial outer peripheral boundary of the section of the core flowpath 52 which extends longitudinally through the stator vane structure 150. This outer peripheral boundary of the core flowpath 52 may be adjacent to and substantially or completely flush with a radial outer peripheral boundary of the downstream section of the core flowpath 52 which extends longitudinally along the exhaust nozzle 86 to the core exhaust 58.

The stator vanes 156 are arranged and may (or may not) be equispaced circumferentially about the propulsion system axis 38 in an annular array; e.g., a circular array. Each stator vane 156 is connected to the vane structure inner platform 152 and the vane structure outer platform 154. Each stator vane 156, for example, may be formed integral with or attached (e.g., mechanically fastened, bonded, etc.) to the vane structure inner platform 152 and the vane structure outer platform 154. Each stator vane 156 projects spanwise out from the vane structure inner platform 152, radially across the core flowpath 52, to the vane structure outer platform 154.

The stator vane structure 150 is disposed radially inboard of the inner nacelle structure 84. A sidewall 166 of the inner nacelle structure 84, for example, is spaced radially outboard of the stator vane structure 150 and its vane structure outer platform 154. This nacelle sidewall 166 extends axially along the propulsion system axis 38 to the exhaust nozzle 86. The nacelle sidewall 166 extends circumferentially about (e.g., partially or completely around) the propulsion system axis 38. The nacelle sidewall 166 of FIG. 3 thereby axially overlaps and extends at least partially circumferentially around the stator vane structure 150 and its vane structure outer platform 154.

The air system 36 is configured to facilitate cooling of the electric machine 108 and/or venting of the tail cone structure 88. The air system 36 of FIG. 3, for example, is configured to direct air (e.g., pressurized air) received from an air source 168 into the tail cone structure 88 and its tail cone volume 142. This air system 36 is also configured to flow the air within the tail cone structure 88 and its tail cone volume 142 such that the air may (a) impingement cool, convectively cool and/or otherwise air cool the electric machine 108 and (b) then be exhausted from the tail cone structure 108 and its tail cone volume 142 through the tail cone outlet 149; e.g., into the external environment 94. This flow of the air through the tail cone volume 142 and out of the tail cone outlet 149 may also vent the tail cone volume 142.

Figure 4:
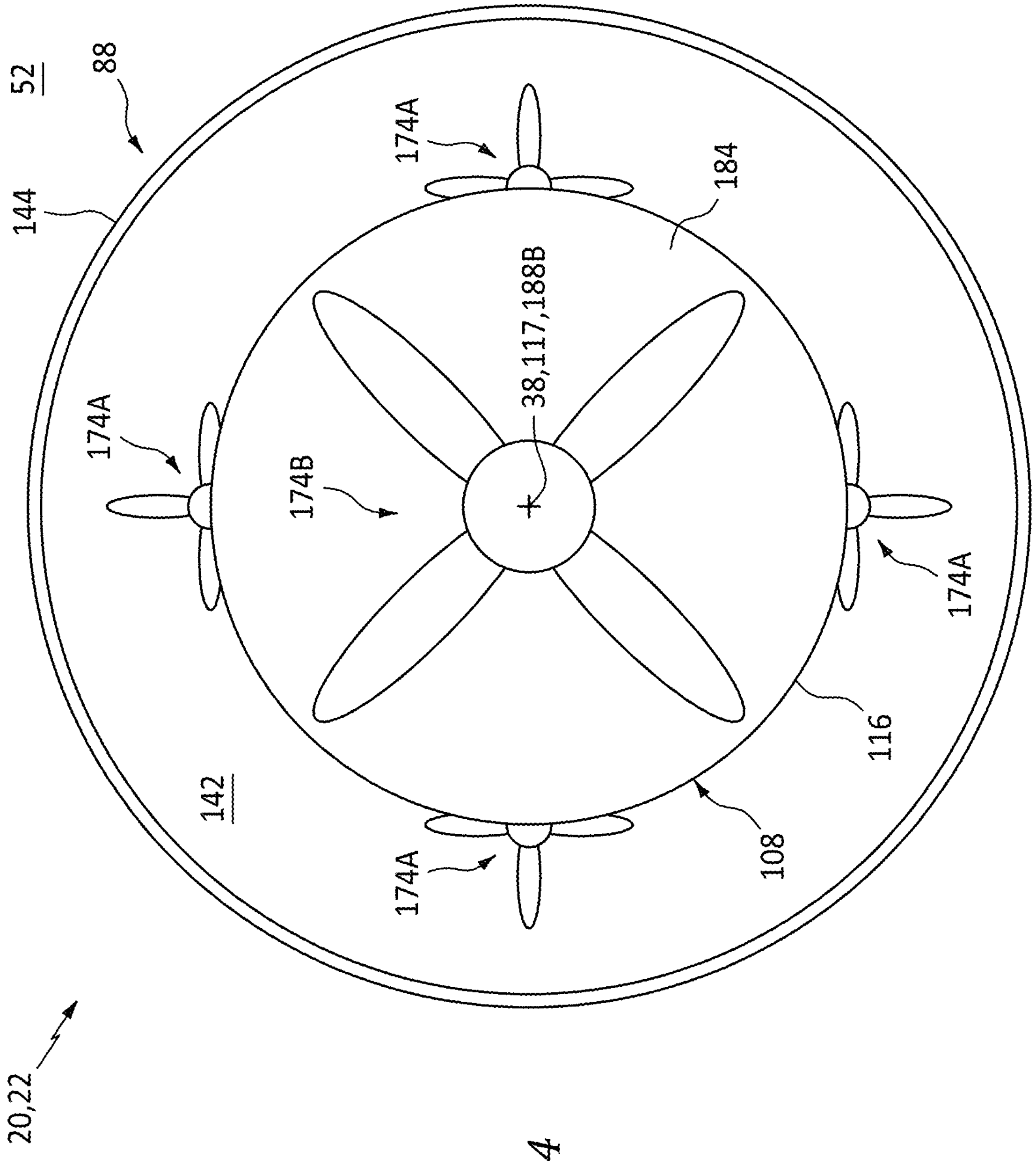
FIG. 4 is a schematic end view illustration of a portion of the aircraft propulsion system with the air system.

The air system 36 of FIG. 3 includes an air circuit 170, a control valve 172 and one or more air movers 174A and 174B (generally referred to as "174"); see also FIG. 4. The air circuit 170 is configured as a single or multi-path air passage fluidly coupling the air source 168 to the tail cone volume 142, for example through an internal volume 176 (e.g., an inner bore) of the stator vane structure 150. The air circuit 170, for example, extends longitudinally from an airflow inlet 178 into the air circuit 170, through the control valve 172, to one or more airflow outlets 180 from the air circuit 170. At the stator vane structure 150, the air circuit 170 of FIG. 3 extends radially inward across the core flowpath 52 through one or more of the stator vanes 156, to the circuit outlets 180. The circuit inlet 178 is fluidly coupled to and is configured to receive a flow of the air from the air source 168. The circuit outlets 180 are fluidly coupled to and configured to direct the flow of air into the tail cone volume 142, for example through the vane structure volume 176.

The control valve 172 is configured to regulate the flow of the air received from the air source 168 and directed to the circuit outlets 180 for injection into the tail cone volume 142. For example, the control valve 172 may fully open such that air received from the core flowpath 52 through the circuit inlet 178 may flow substantially unrestricted through the air circuit 170 to the circuit outlets 180. In another example, the control valve 172 may fully close such that no air (or only a minimum level of air received from the core flowpath 52 through the circuit inlet 178) flows through the air circuit 170 to the circuit outlets 180. In still another example, the control valve 172 may be partially opened (or partially closed) such that a metered flow of air received from the core flowpath 52 through the circuit inlet 178 flows through the air circuit 170 to the circuit outlets 180.

The electric machine 108 may be arranged axially along the propulsion system axis 38 between the upstream air movers 174A (see also FIG. 4) and the downstream air mover 174B. Each upstream air mover 174A may be disposed proximate an axial upstream, forward end 182 of the electric machine 108. Each upstream air mover 174A of FIG. 3, for example, is (e.g., slightly) spaced axially forward and upstream from the electric machine (EM) forward end 182 along the propulsion system axis 38. Here, each upstream air mover 174A is disposed axially between the electric machine 108 and the engine core 50 (see FIG. 1). The downstream air mover 174B may be disposed proximate an axial downstream, aft end 184 of the electric machine 108. The downstream air mover 174B of FIG. 3, for example, is (e.g., slightly) spaced axially aft and downstream from the electric machine (EM) aft end 184 along the propulsion system axis 38. Here, the downstream air mover 174B is disposed axially between the electric machine 108 and the tail cone outlet 149 at the aft ends 42, 148.

Referring to FIG. 4, the upstream air movers 174A are arranged and may be equispaced circumferentially about the propulsion system axis 38 in an array; e.g., a circular array. Referring again to FIG. 3, each upstream air mover 174A may radially overlap and may project radially inward and/or outward beyond a radial outer peripheral edge 186 of the electric machine 108. A centerline and/or rotational axis 188A of each upstream air mover 174A of FIG. 3, for example, is (e.g., laterally) offset from the EM axis 117 of the electric machine 108. With this configuration, each upstream air mover 174A is configured to direct (e.g., propel) the air output from the air circuit 170 through the circuit outlets 180 towards the electric machine 108. An inner portion of this air may be directed to impinge against the electric machine 108 to impingement cool the electric machine 108. An outer portion of the air may be directed to flow along the electric machine 108 to convectively cool the electric machine 108. Of course, it is also contemplated one or more of the upstream air movers 174A may also or alternatively direct some of the air internally into the electric machine 108 to internally air cool the electric machine 108.

The downstream air mover 174B may (or may not) be centered within the tail cone structure 88. A rotational centerline and/or rotational axis 188B of the downstream air mover 174B of FIG. 3, for example, may be coaxial with the EM axis 117 of the electric machine 108. With this arrangement, the downstream air mover 174B is configured to direct (e.g., draw) the air along the electric machine 108 and further direct (e.g., propel) that air out of the tail cone volume 142 into the external environment 94 through the tail cone outlet 149.

Figure 5:
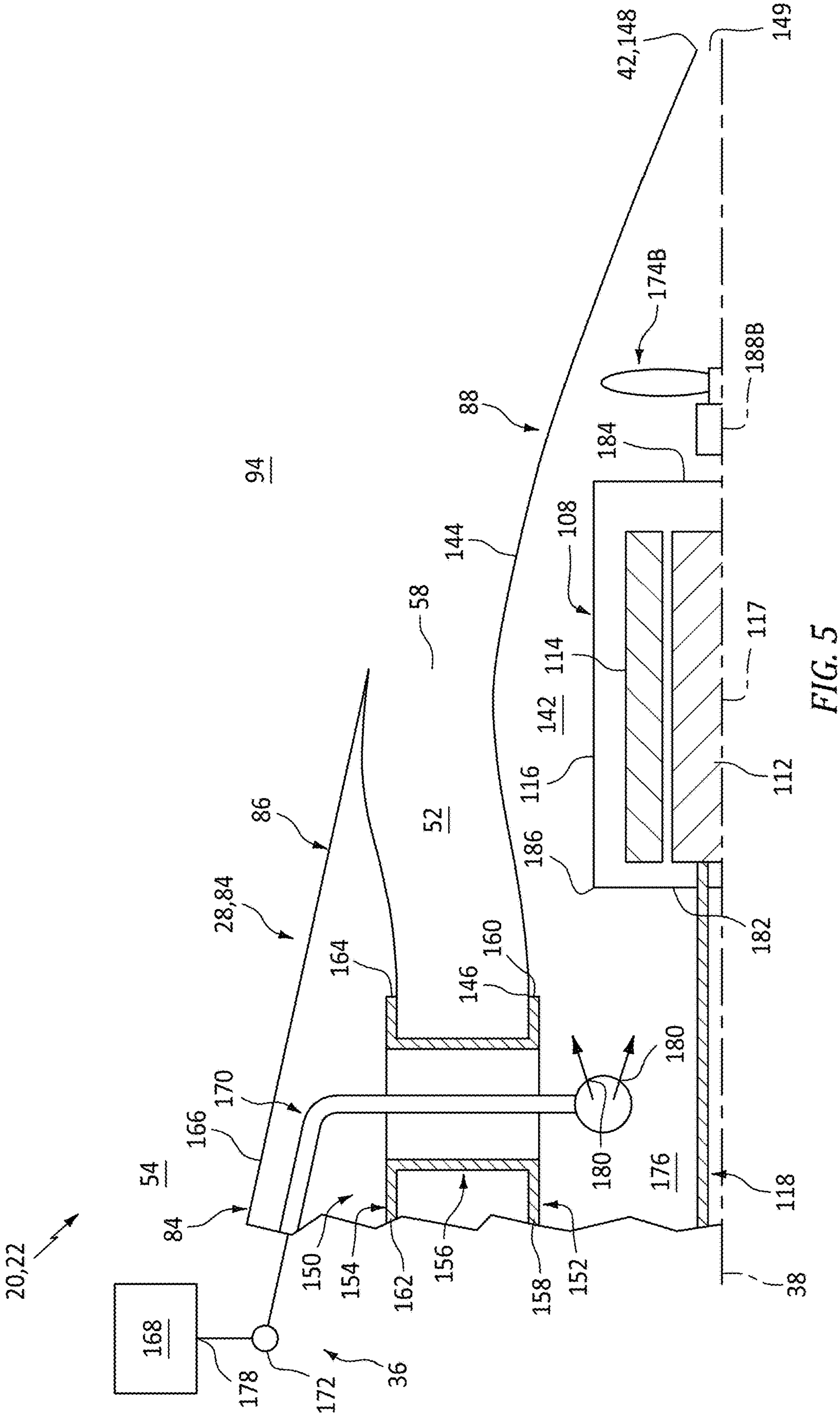
FIGS. 5 and 6 are schematic illustrations of a portion of the aircraft propulsion system with various alternative air system arrangements.
Figure 6:
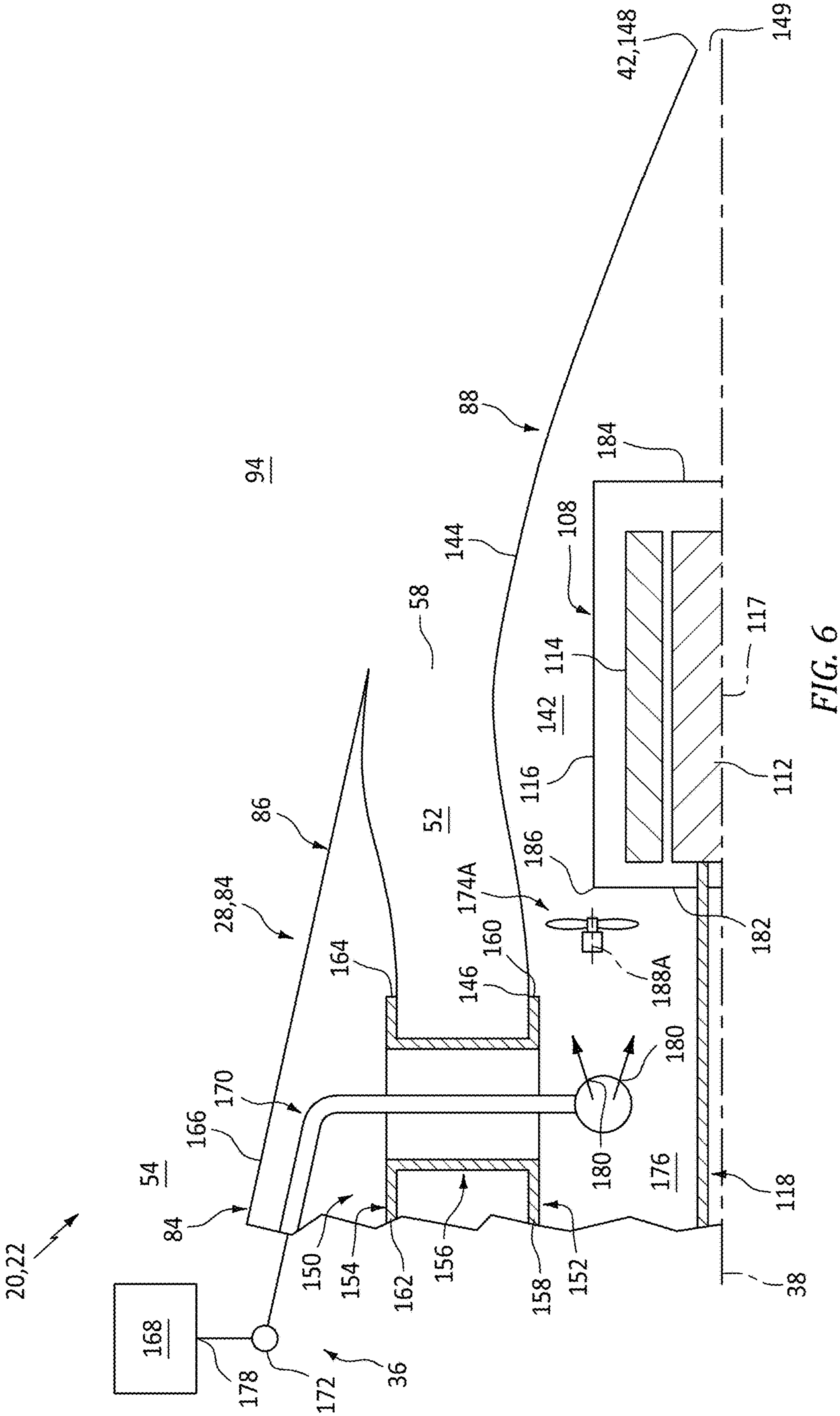

With the arrangement of FIG. 3, the upstream air movers 174A and the downstream air mover 174B collectively operate to move the air through the tail cone volume 142. In other embodiments however, referring to FIG. 5, one or more or all of the upstream air movers 174A (see FIGS. 3 and 4) may be omitted from the air system 36. The downstream air mover 174B of FIG. 5, for example, may be configured to functionally replace the upstream air movers 174A. In still other embodiments, referring to FIG. 6, the downstream air mover 174B (see FIGS. 3 and 4) may be omitted from the air system 36. The upstream air mover(s) 174A of FIG. 6, for example, may be configured to functionally replace the downstream air mover 174B.

Figure 7:
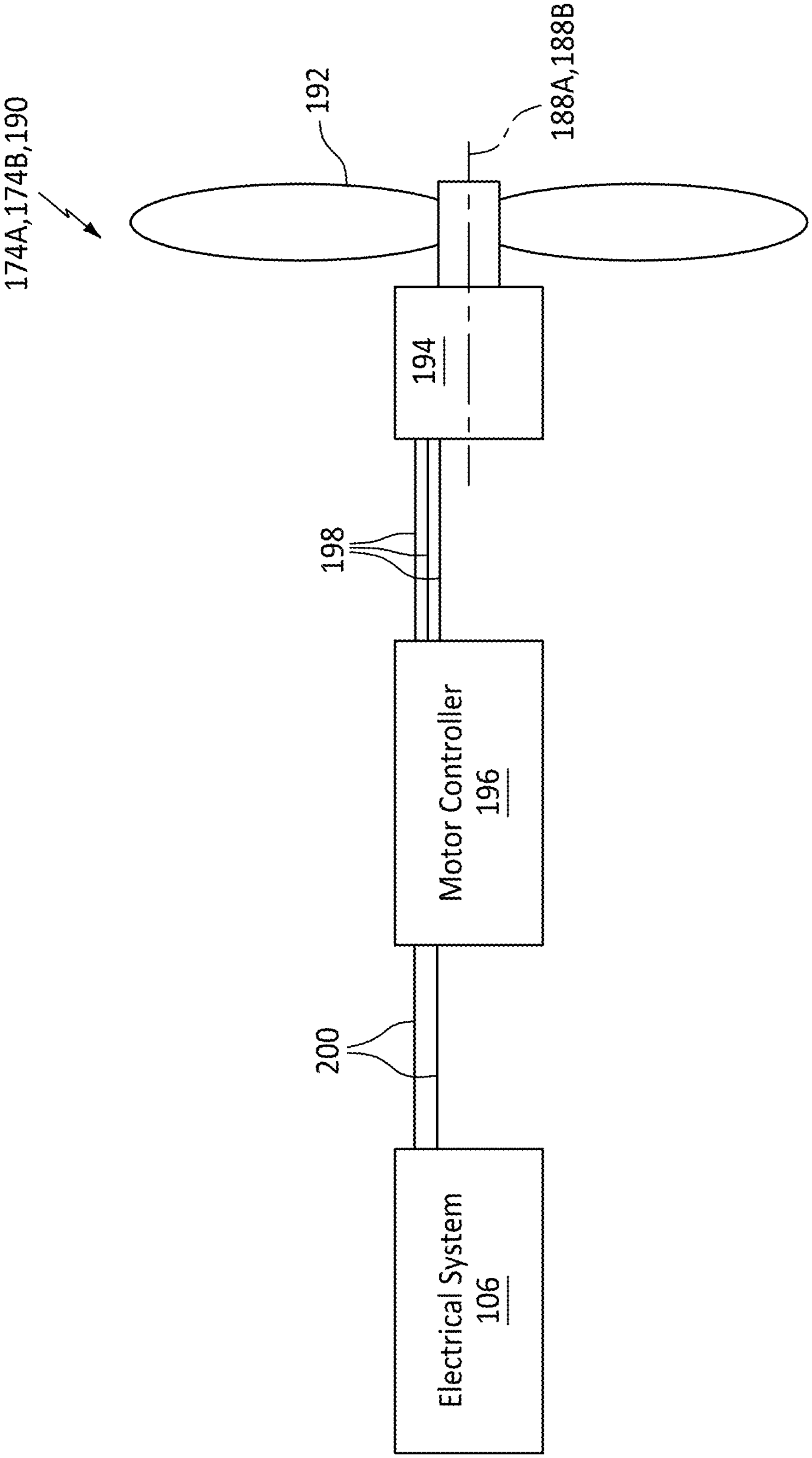
FIG. 7 is a schematic illustration of an air mover electrically coupled to an aircraft electrical system through a motor controller.

Referring to FIG. 7, each air mover 174 may be configured as an electric fan 190. The air mover 174 of FIG. 7, for example, includes a bladed fan rotor 192 and an electric motor 194 operatively coupled to the fan rotor 192. This electric motor 194 is configured to drive rotation of the fan rotor 192 about its respective rotational axis 188A, 188B (generally referred to as "188"). The electric motor 194 may be powered by the aircraft electrical system 106. The electric motor 194 may be controlled by a motor controller 196 electrically coupled between the electric motor 194 and the aircraft electrical system 106. Briefly, the electric motor 194 of FIG. 7 is electrically coupled to the motor controller 196 through a first electrical coupling (e.g., electrical cables 198), and the motor controller 196 of FIG. 7 is electrically coupled to the aircraft electrical system 106 through a second electrical coupling (e.g., electrical cables 200). By using the electric motor 194 to drive the rotation of the fan rotor 192, the respective air mover 174 may be selectively actuated (e.g., the operation thereof may be tuned) to meet the cooling and/or venting requirements for the electric machine 108 and the tail cone structure 88. The present disclosure, however, is not limited to electrically actuated air movers. The fan rotor 192, for example, may alternatively be driven by another type of actuation device; e.g., a pneumatic motor, a hydraulic motor, a fueldraulic motor, etc. Moreover, while the air mover 174 of FIG. 7 is described above with the fan rotor 192, it is contemplated the air mover 174 may also or alternatively include another air moving device; e.g., a bladed compressor rotor, pump, etc.

In some embodiments, referring to FIG. 3, each of the air movers 174A, 174B may be disposed within the tail cone structure 88 and its tail cone volume 142. In other embodiments, one or more of the upstream air movers 174A may alternatively be disposed external to the tail cone structure 88 and its tail cone volume 142. Each upstream air mover 174A, for example, may be disposed next to the tail cone structure 88 and its tail cone volume 142 within the vane structure volume 176.

Referring to FIG. 3, the air source 168 may be any source of pressurized air (e.g., compressed air, forced induction air, etc.) available for use by the air system 36. In some embodiments, the air source 168 may be internal to the aircraft propulsion system 22. The air source 168, for example, may be configured as or otherwise include the core flowpath 52 of FIG. 1, the bypass flowpath 54 of FIG. 1 or another flowpath (if included) in the aircraft propulsion system 22. In other embodiments, the air source 168 may be external to the aircraft propulsion system 22. The air source 168, for example, may be configured as or otherwise include the external environment 94 (see FIG. 1) where the circuit inlet 178 may be disposed along an exterior surface of the outer housing structure 30 of FIG. 1, along an exterior surface of a pylon structure mounting the aircraft propulsion system 22 to a component of an aircraft airframe; e.g., an aircraft wing, an aircraft fuselage, etc. The present disclosure, however, is not limited to the foregoing exemplary air source configurations.

The aircraft propulsion system 22 of FIG. 1 is described above as a ducted propulsor propulsion system; e.g., the turbofan propulsion system. The present disclosure, however, is not limited to such an exemplary aircraft propulsion system. For example, referring to FIG. 8, the outer housing structure 30 (see FIG. 1) may be omitted from the propulsion system housing 26 to open the propulsor rotor 64 up to the external environment 94. More particularly, the propulsor rotor 64 of FIG. 8 includes a plurality of open propulsor blades 202 arranged circumferentially about the propulsion system axis 38 in an array; e.g., a circular array. This array of the propulsor blades 202 may be unshrouded or alternatively shrouded by a tubular propulsor rotor shroud dedicated to the propulsor rotor 64 for example. Each of these propulsor blades 202 projects spanwise (e.g., radially) out from a base of the propulsor rotor 64, into the external environment 94, to a distal tip 204 of the respective propulsor blade 202. Each propulsor blade 202 is thereby configured as an un-ducted propulsor blade which is exposed to (e.g., disposed in) the surrounding external environment 94. With this arrangement, the propulsor rotor 64 is an open propulsor rotor (e.g., an un-ducted propulsor rotor) and the aircraft propulsion system 22 is configured as an open rotor propulsion system. Moreover, the inner housing structure 28 and its nacelle structure may form an exterior of the aircraft propulsion system 22 and may border the external environment 94.

The guide vane structure 32 may also be open to the external environment 94 forming an open guide vane structure. This guide vane structure 32 of FIG. 8 includes a plurality of open exit guide vanes 206; e.g., airfoils. The guide vanes 206 are arranged and may (or may not) be equispaced circumferentially about the propulsion system axis 38 in an array; e.g., a circular array. This array of the guide vanes 206 may be unshrouded or alternatively shrouded by a tubular guide vane shroud dedicated to the guide vane structure 32 for example. This guide vane structure 32 and its guide vanes 206 are arranged axially next to (e.g., adjacent) the propulsor rotor 64 and its propulsor blades 202. The guide vane structure 32 and its guide vanes 206 of FIG. 8, for example, are arranged downstream of the propulsor rotor 64 and its propulsor blades 202, without (e.g., any) other elements axially therebetween to obstruct, turn and/or otherwise influence the air propelled by the propulsor rotor 64 to the guide vane structure 32. Each of the guide vanes 206 projects radially out from an exterior surface of the inner housing structure 28, into the external environment 94, to a distal tip 208 of the respective guide vane 206. Each guide vane 206 is thereby configured as an un-ducted guide vane which is exposed to (e.g., disposed in) the surrounding external environment 94. With the foregoing arrangement, the guide vane structure 32 and its guide vanes 206 are configured to condition (e.g., straighten out, de-swirl, etc.) an outer stream of air propelled by the propulsor rotor 64 within the external environment 94 that bypass the engine core 50. Of course, in other embodiments, the guide vane structure 32 may be omitted where, for example, the aircraft propulsion system 22 is alternatively configured as a counter-rotating open rotor (CROR) aircraft propulsion system, etc.

Figure 8:
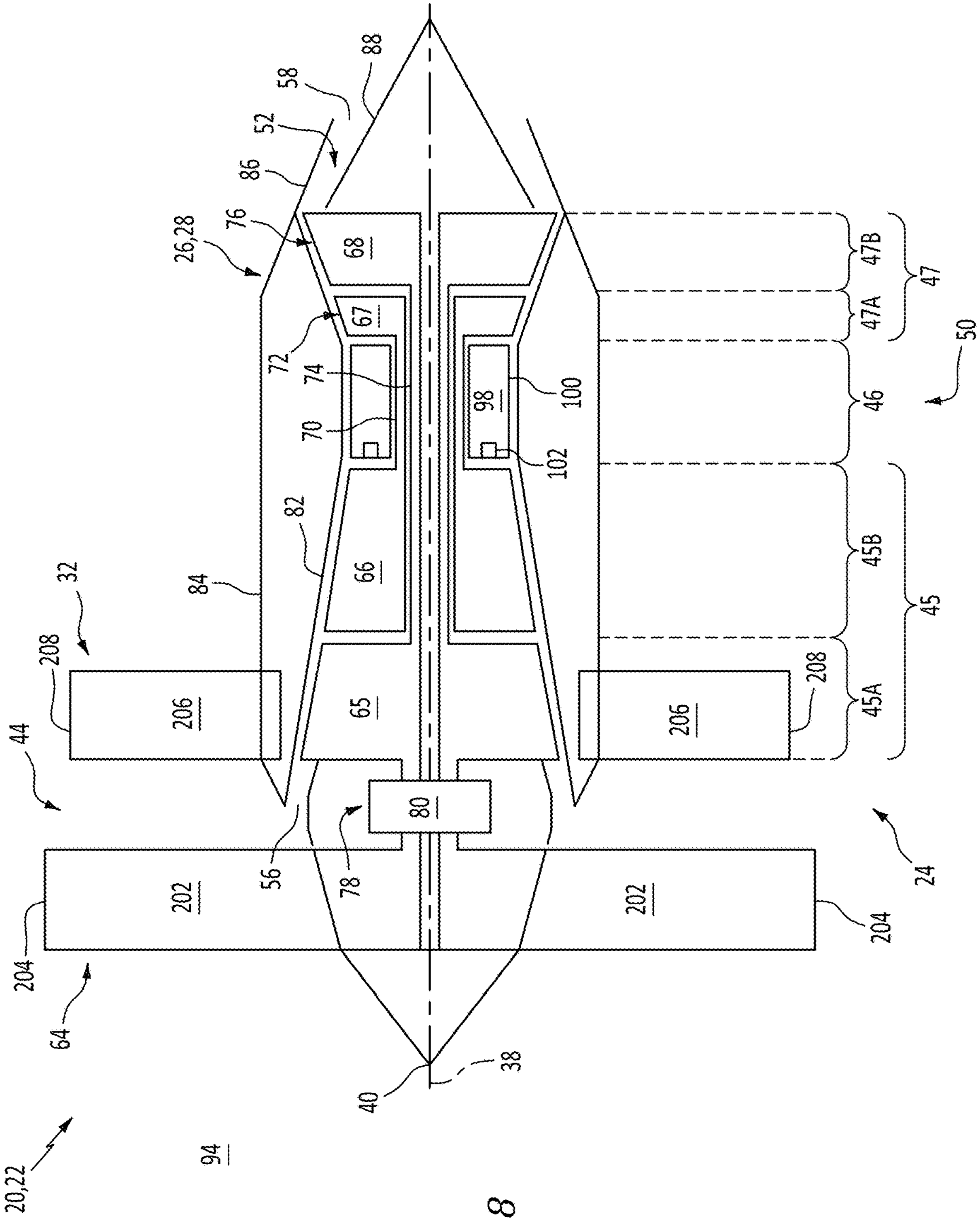
FIG. 8 is a partial schematic illustration of the aircraft propulsion system with an open propulsor rotor.

While the turbine engine 24 in FIG. 1 and FIG. 8 is shown with a particular two rotating structure arrangement, the present disclosure is not limited thereto. For example, the LPC rotor 65 may be omitted to configure the LPT rotor 68 as a power turbine (PT) rotor for the propulsor rotor 64. In another example, the turbine engine 24 may also include another rotating structure; e.g., an intermediate speed spool for the turbine engine 24 and its engine core 50.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:

a compressor section;

a combustor section;

a turbine section;

a flowpath comprising a flowpath inlet and a flowpath exhaust, the flowpath extending through the compressor section, the combustor section and the turbine section from the flowpath inlet to the flowpath exhaust;

a tail cone structure forming an inner peripheral boundary of the flowpath at the flowpath exhaust, the tail cone structure comprising an internal volume and an outlet fluidly coupled with the internal volume;

an electric machine disposed within the internal volume; and an electric fan configured to flow air within the internal volume such that the air cools the electric machine and is exhausted from the tail cone structure through the outlet, wherein the electric fan is one of a plurality of electric fans configured to flow the air within the internal volume, and the plurality of electric fans are arranged circumferentially about an axis in an array.

2. An assembly for an aircraft propulsion system, comprising:

a compressor section;

a combustor section;

a turbine section;

a flowpath comprising a flowpath inlet and a flowpath exhaust, the flowpath extending through the compressor section, the combustor section and the turbine section from the flowpath inlet to the flowpath exhaust;

a tail cone structure forming an inner peripheral boundary of the flowpath at the flowpath exhaust, the tail cone structure comprising an internal volume;

an electric machine disposed within the internal volume; and an electric fan disposed within the tail cone structure, the electric fan configured to flow air within the internal volume such that the air cools the electric machine.

3. The assembly of claim 1, wherein the electric machine is disposed between a first plurality of the electric fans and the outlet.

4. The assembly of claim 1, further comprising a second electric fan disposed between the electric machine and the outlet.

5. The assembly of claim 4, wherein a rotational axis of the second electric fan is coaxial with a rotational axis of the electric machine.

6. The assembly of claim 1, wherein a rotational axis of a first plurality of the electric fans is offset from a rotational axis of the electric machine.

7. The assembly of claim 2, wherein the electric fan is one of a plurality of electric fans configured to flow the air within the internal volume.

8. The assembly of claim 7, wherein the plurality of electric fans include a first electric fan and a second electric fan, and the electric machine is disposed axially between the first electric fan and the second electric fan.

9. The assembly of claim 7, wherein the plurality of electric fans include a first electric fan and a second electric fan, and the first electric fan is axially aligned with the second electric fan.

10. The assembly of claim 7, wherein the plurality of electric fans are arranged circumferentially about an axis in an array.

11. The assembly of claim 1, further comprising:

an air source; and an air circuit comprising a circuit inlet and a circuit outlet, the circuit inlet configured to receive the air from the air source, and the circuit outlet configured to direct the air into the internal volume.

12. The assembly of claim 11, further comprising:

a vane structure including an inner platform, an outer platform and a plurality of vanes;

the inner platform forming an inner peripheral boundary of the flowpath through the vane structure;

the outer platform forming an outer peripheral boundary of the flowpath through the vane structure;

the plurality of vanes arranged circumferentially about an axis in an array, each of the plurality of vanes extending radially across the flowpath from the inner platform to the outer platform, and the plurality of vanes comprising a first vane;

the air circuit configured to direct the air radially inward across the flowpath through the first vane.

13. The assembly of claim 1, wherein the electric machine is configurable as an electric motor during a motor mode of operation.

14. The assembly of claim 1, wherein the electric machine is configurable as an electric generator during a generator mode of operation.

15. The assembly of claim 1, further comprising:

a rotating structure comprising a bladed rotor disposed in the compressor section or the turbine section;

the electric machine comprising an electric machine rotor operatively coupled to the rotating structure.

16. The assembly of claim 1, further comprising:

a ducted propulsor rotor; and a rotating structure operatively coupled to and configured to drive rotation of the ducted propulsor rotor, the rotating structure comprises a turbine rotor disposed in the turbine section.

17. The assembly of claim 1, further comprising:

an open propulsor rotor; and a rotating structure operatively coupled to and configured to drive rotation of the open propulsor rotor, the rotating structure comprises a turbine rotor disposed in the turbine section.

18. An assembly for an aircraft propulsion system, comprising:

a compressor section;

a combustor section;

a turbine section;

a flowpath comprising a flowpath inlet and a flowpath exhaust, the flowpath extending through the compressor section, the combustor section and the turbine section from the flowpath inlet to the flowpath exhaust;

a tail cone structure forming an inner peripheral boundary of the flowpath at the flowpath exhaust, the tail cone structure comprising an internal volume;

an electric machine disposed within the internal volume; and an air system configured to direct air into the tail cone structure to cool the electric machine, the air system comprising a plurality of electric air movers arranged circumferentially about an axis in an array.

19. The assembly of claim 18, wherein the tail cone structure further comprises an outlet fluidly coupled with the internal volume; and the outlet is configured to exhaust the air from the tail cone structure.

20. The assembly of claim 18, wherein the plurality of electric air movers are disposed within the tail cone structure.

* * * * *